US008230340B2

(12) United States Patent (10) Patent No.: US 8,230,340 B2
Kang et al. (45) Date of Patent: Jul. 24, 2012

(54) METHOD AND APPARATUS FOR DISPLAYING CONTENT LIST

(75) Inventors: Hyun-Joo Kang, Suwon-si (KR); In-Sik Myung, Incheon (KR); Joo-Kyung Woo, Seoul (KR); Deok-Won Kim, Incheon (KR); Ju-Youn Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 772 days.

(21) Appl. No.: 12/142,277

(22) Filed: Jun. 19, 2008

(65) Prior Publication Data

US 2009/0183075 A1 Jul. 16, 2009

(30) Foreign Application Priority Data

Jan. 15, 2008 (KR) .................. 10-2008-0004466

(51) Int. Cl.
*G06F 3/00* (2006.01)
(52) U.S. Cl. .................. 715/716; 715/727; 715/728
(58) Field of Classification Search .................. 715/716, 715/727, 728; 707/104.1
See application file for complete search history.

(56) References Cited

U.S. PATENT DOCUMENTS

| 7,756,388 | B2 * | 7/2010 | Plastina et al. ............. 386/241 |
| 7,827,259 | B2 * | 11/2010 | Heller et al. ............... 709/223 |
| 7,880,077 | B2 * | 2/2011 | Pauws et al. ............... 84/615 |
| 2005/0240661 | A1 | 10/2005 | Heller et al. |
| 2006/0212478 | A1 | 9/2006 | Plastina et al. |
| 2007/0172131 | A1 * | 7/2007 | Chosokabe ................. 382/224 |
| 2008/0104112 | A1 * | 5/2008 | Nicholl et al. ............. 707/104.1 |
| 2009/0063975 | A1 * | 3/2009 | Bull et al. ................... 715/716 |

FOREIGN PATENT DOCUMENTS

| EP | 1756826 A0 | 2/2007 |
| JP | 2002023771 A | 1/2002 |
| KR | 1020060060304 A | 6/2006 |
| KR | 1020070048484 A | 5/2007 |
| WO | 2005106878 A2 | 11/2005 |
| WO | 2006/040710 A1 | 4/2006 |

OTHER PUBLICATIONS ( Lastfm © 2007; p. 1).*
Lastfm © 2007; p. 1.*
Vinay V. et al., "Can constrained relevance feedback and display strategies help users retrieve items on mobile devices?", Information Retrieval, Sep. 2006, pp. 435-453, vol. 9, No. 4, Kluwer Academic Publishers.
Leikas J. et al., "Multi-User Mobile Applications and a Public Display: Novel Ways for Social Interaction", Fourth Annual IEEE International Conference on Pervasive Computing and Communications, Mar. 2006, pp. 66-70, IEEE, Piscataway, NJ.
Communication dated Jan. 31, 2012 from the State Intellectual Property Office of P.R. China in counterpart Chinese application No. 200910003103.2.

* cited by examiner

*Primary Examiner* — William Bashore
*Assistant Examiner* — Sherrod Keaton
(74) *Attorney, Agent, or Firm* — Sughrue Mion, PLLC

(57) ABSTRACT

A method and apparatus for displaying a content list are provided, which can display various content lists based on information on content being currently played through a user's simple manipulation. The method of displaying a content list includes receiving a user command, and displaying a content list belonging to a category set on the basis of information on content being currently played, in accordance with the received user command.

23 Claims, 6 Drawing Sheets

Y : YELLOW COLOR

B : BLUE COLOR

R : RED COLOR

YG : YELLOWISH GREEN COLOR

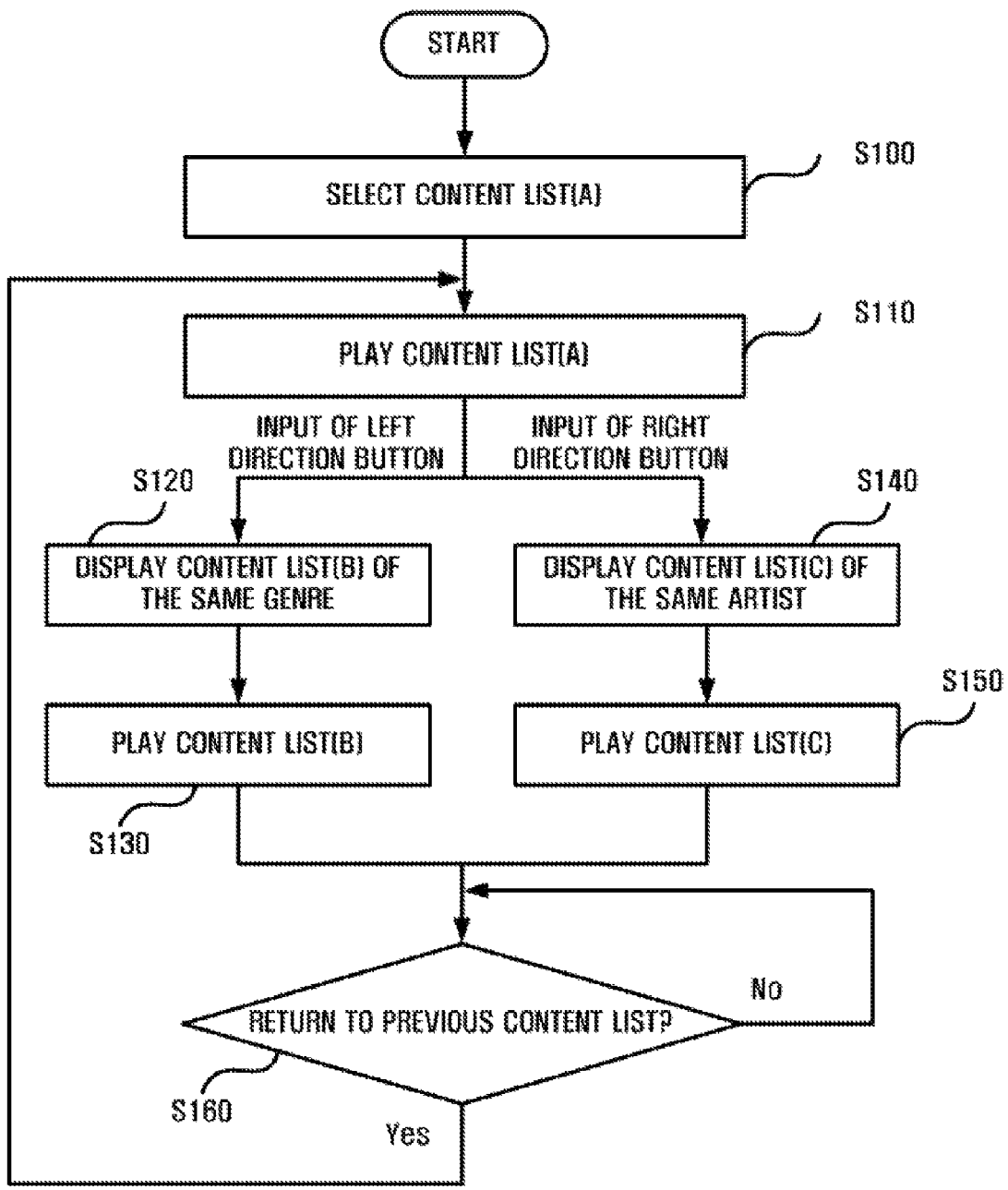

Y : YELLOW COLOR
B : BLUE COLOR
R : RED COLOR
YG : YELLOWISH GREEN COLOR

METHOD AND APPARATUS FOR DISPLAYING CONTENT LIST

CROSS-REFERENCE TO RELATED APPLICATION

This application is based on and claims priority from Korean Patent Application No. 10-2008-0004466 filed on Jan. 15, 2008 in the Korean Intellectual Property Office, the disclosure of which is incorporated herein in its entirety by reference.

BACKGROUND OF THE INVENTION

1. Field of the Invention

Methods and apparatuses consistent with the present invention relate to displaying a content list, and, more particularly, to displaying various content lists based on information on content being currently played through a user's simple manipulation.

2. Description of the Prior Art

Recently, as mass digital storage devices, such as hard disk drives, flash memories, and others, have been used and as content compression technology has been developed, the amount of content that terminals using such digital storage devices store and process has abruptly increased. In comparison to the past terminals that only have tens or hundreds of content items, recent terminals can possess tens of thousands of content items in a storage space of several tens of gigabytes.

This trend has accelerated as network-connectable media terminals such as Internet Protocol Televisions (IPTVs) have appeared. For example, in the case of iTunes Music Store, the online music service of Apple Corporation, approximately 3,500,000 Moving Pictures Experts Group-1 Audio Layer 3 (MP3) songs are available, and a terminal directly connected to the iTunes Music Store can process several million online content items, regardless of its storage capacity.

Accordingly, research on methods of preparing and using a content list that determines in what order content desired by a user should be played has been conducted.

According to a related art content playback method, in order for a user to play content that does not exist in a content list in a state that content in the content list is successively played, it is required to prepare a new content list or to select other content through a content search.

Also, in the case of playing content while moving or doing other tasks, a user may select another content list if the user does not like the content list being currently played. In this case, the user should stop and reset the content list, which is inconvenient.

SUMMARY OF THE INVENTION

Accordingly, an aspect of the present invention is to provide a method and apparatus for displaying a content list, which can display various content lists based on information on content being currently played through a user's simple manipulation.

Additional aspects and features of the present invention will be set forth in part in the description which follows and in part will become apparent to those having ordinary skill in the art upon examination of the following or may be learned from practice of the invention.

According to one aspect of the present invention, there is provided a method of displaying a content list, according to exemplary embodiments of the present invention, which includes receiving a user command; and displaying a content list belonging to a category set on the basis of information on content being currently played, in accordance with types of received user commands.

According to another aspect of the present invention, there is provided an apparatus for displaying a content list, which includes an input unit receiving a user command; an output unit displaying a content list; and a control unit controlling the output unit to display the content list belonging to a category set on the basis of information on content being currently played, in accordance with types of received user commands.

BRIEF DESCRIPTION OF THE DRAWINGS

The above and other aspects and features of the present invention will be apparent from the following detailed description taken in conjunction with the accompanying drawings, in which:

FIG. 4 is a flowchart illustrating a method of displaying a content list according to an exemplary embodiment of the present invention.

DETAILED DESCRIPTION OF THE EXEMPLARY EMBODIMENTS OF THE PRESENT INVENTION

Figure 1:
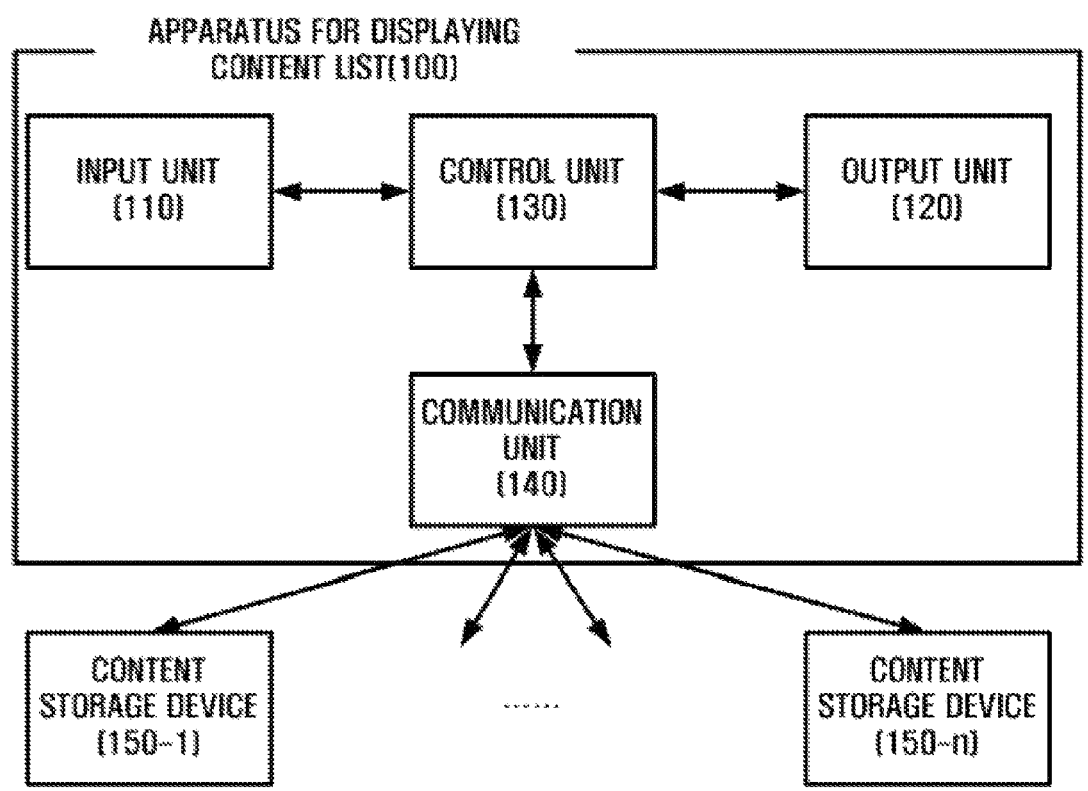
FIG. 1 is a block diagram illustrating the construction of an apparatus for displaying a content list according to an exemplary embodiment of the present invention.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the exemplary embodiments of the present invention, the same drawing reference numerals are used for the same elements across various figures.

The present invention will be described herein with reference to the accompanying drawings illustrating block diagrams and flowcharts for explaining a method and apparatus for displaying a content list according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a block diagram illustrating the construction of an apparatus 100 for displaying a content list according to an exemplary embodiment of the present invention.

The apparatus 100 for displaying a content list includes an input unit 110 receiving a user command, an output unit 120 displaying a user interface including a content list, and a control unit 130 controlling the output unit 120 to display the content list belonging to a category set on the basis of information on the content being currently played, in accordance with the type of received user command.

Here, the content may include a music file, a photo file, a video file, User Created Content (UUC), or an IPTV advertisement, but is not limited thereto.

The apparatus 100 for displaying the content list may be integrated into a content player such as a portable phone, an MP3 player, a Portable Multimedia Player (PMP), a computer device, or an audio device, but is not limited thereto. It is also possible that the apparatus 100 for displaying the content list may be implemented separately from the content player. If the apparatus 100 for displaying the content list is implemented separately from the content player, it may further include a port for communications with the content player.

The input unit 110 is provided with a plurality of buttons or wheels, and senses a user's touch or push of the respective buttons or rotation of the respective wheels. Accordingly, by touching or pushing the buttons or rotating the wheels provided in the input unit 110, the user can search or select the content list. Particularly, in an exemplary embodiment of the present invention, up/down/left/right direction buttons may be used to change the content list. In addition, a (+) button, a (−) button, or another specified button or wheel may be used to change the content list. In contrast, the input unit 110 may be a separate device that receives and transmits the user command to the control unit 130. For example, the input unit 110 may be a remote controller that transmits the user command as a wireless signal, such as an infrared signal, a Radio Frequency (RF) signal, and so forth, or may be a specified wired device that transmits the user command to the control unit 130 via a wire.

The output unit 120 displays the user interface that includes the content list. In order to display the user interface, the output unit 120 may be implemented by a display means, such as a Cathode Ray Tube (CRT), an Liquid Crystal Display (LCD), a Plasma Display Panel (PDP), an organic Electro-Luminescent (EL) device, and so forth. In contrast, the output unit 120 may be implemented by a specified display device existing separately from the apparatus 100 for displaying the content list.

The control unit 130 controls the output unit 120 to display the user interface including the content list that belongs to a category set on the basis of information on the content being currently played. Details of the user interface including the content list will be described later.

In a home network environment, the apparatus 100 for displaying the content list may further include a communication unit 140 for communications with one or more content storage devices 150-1 to 150-n. The control unit 130 operates to communicate with the content storage devices 150-1 to 150-n through the communication unit 140, retrieve the content stored in the content storage devices 150-1 to 150-n to construct and display the content list, and play the selected content.

Figure 2:
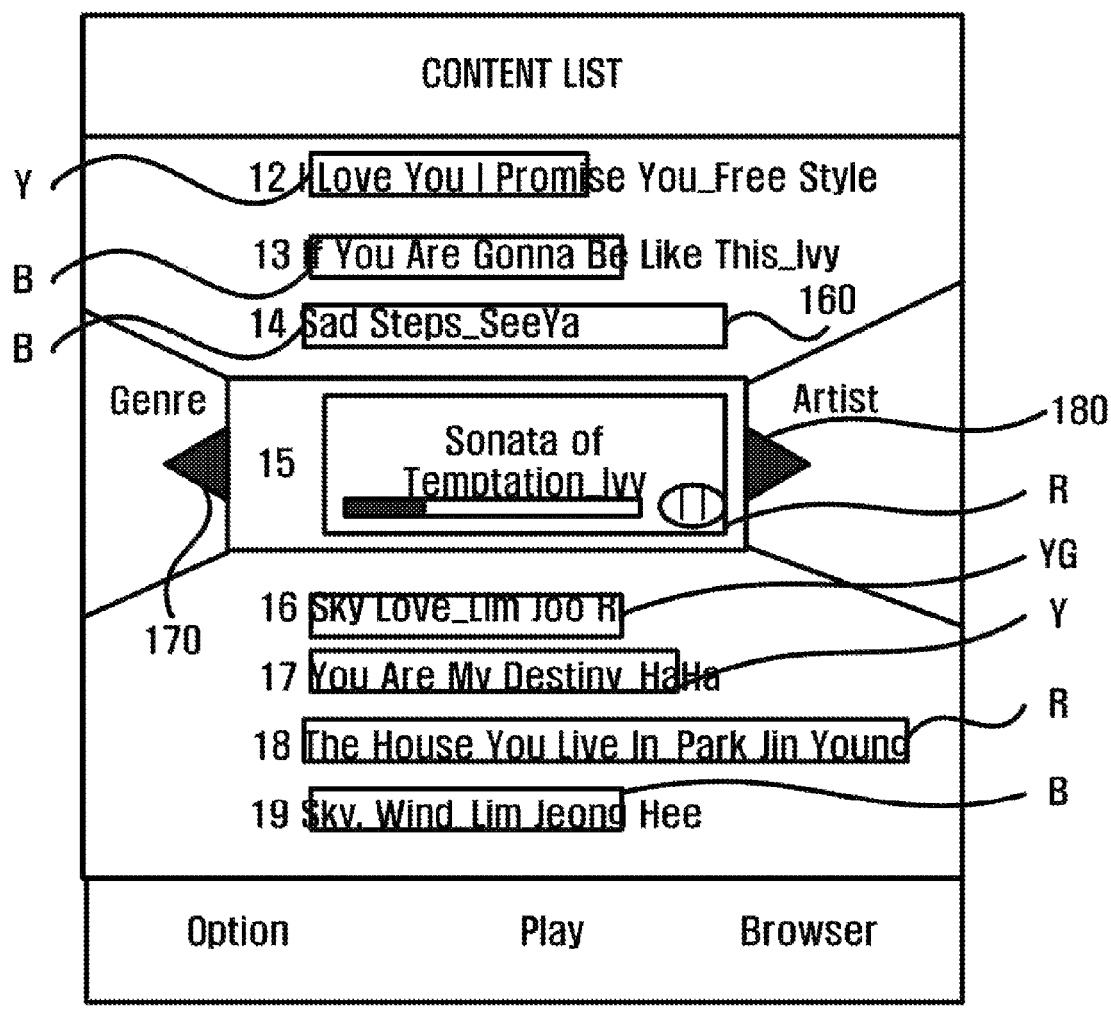
FIG. 2 is a view explaining an example of a user interface which includes a content list and is displayed on an output unit according to an exemplary embodiment the present invention.

FIG. 2 is a view explaining an example of a user interface which includes a content list and is displayed on the output unit 120 according to an exemplary embodiment of the present invention.

If a command for instructing a menu display is received while the system is driven or content is played, the content list may be displayed and a focus may be positioned on the content being currently played in the content list.

In the present exemplary embodiment of the present invention, a category set on the basis of information on the content being currently played may correspond to "the same genre as the content being currently played" and "the same artist as the content being currently played".

Also, the left direction button is recognized as a command to change the current content list to a content list belonging to "the same genre as the content being currently played", and the right direction button is recognized as a command to change the current content list to a content list belonging to "the same artist as the content being currently played". In order to discriminate between them, arrows 170 and 180 for indicating directions may be displayed on a content list screen. However, the present invention is not limited thereto. The left direction button may be recognized as a command to change the current content list to a content list belonging to "a genre different from the genre of the content being currently played", and the right direction button may be recognized as a command to change the current content list to a content list belonging to "an artist different from the artist of the content being currently played". Here, the input unit 110 for changing the content list is not limited to the left and right direction buttons, and various buttons, wheels, or their combinations may function as the input unit 110 for changing the content list.

Also, in the exemplary embodiment of the present invention, the category set on the basis of information on the content being currently played may include at least one of metadata, such as an "album which the content being currently played belongs to" and "the same issue year as (or the issue year different from that of) the content being currently played," in addition to the genre and the artist.

In addition, the information on the content being currently played, which is the basic information for setting the category, may include at least one of information similar to the information on the content being currently played, playback history information of the content being currently played, and total resultant information collected from a plurality of users regarding the content being currently played, but is not limited thereto. Specifically, the category set on the basis of the information similar to the information on the content being currently played may include at least one of "a type similar to the type of the content being currently played", and "an artist having a style similar to the style of the artist of the content being currently played." The category set on the basis of the playback history information of the content being currently played may include at least one of "a case where the number of playbacks is greater than (or less than, or equal to) that of the content being currently played" and "a case where a playback time is longer than (or shorter than, or equal to) that of the content being currently played". The category set on the basis of the total resultant information collected from the plurality of users based on the content being currently played may include "a specified high-rank popular content range (e.g., a top 10 ranking) of the artist of the content being currently played". In contrast, "the type similar to the type of the content being currently played" may be analyzed based on attributes (e.g., tempo, musical instruments used in the content, and so forth) or sales record, but is not limited thereto.

The content list included in the user interface may include content titles arranged in the form of a text and list numbers given to the respective content titles.

In addition, the content list may include content bars 160 provided on the respective content titles. The respective content bar 160 may be expressed with colors indicating genres of the content and a length indicating the playback history information (e.g., the number of playbacks and playback time) of the content. For example, as shown in FIG. 2, a blue content bar 160 represents a ballade genre, a red content bar 160 represents a dance genre, a yellow content bar 160 represents a hip hop genre, and a yellowish green content bar 160 represents a trot genre. Also, as shown in FIG. 2, the length of the content bar 160 may indicate the number of playbacks (or playback time), but is not limited thereto. Here, the length of the content bar 160 may be set in a manner that if the corresponding content is first registered in the content list, it is generated with a preset length, and if a skip or stop is performed during the playback of the content, the length of the content bar 160 is automatically shortened. Further, in the case of successively playing the content in the content list, the content corresponding to the content bar 160 having a length below a specified length may be automatically skipped.

In addition, in the content list, an area of the content being currently played, on which the focus is positioned, may be set to be wider than an area of any other content. In contrast, if the playback of the content is stopped, the position of the focus may be kept as it is, so that the next playback starts from the content on which the focus is positioned.

Figure 3:
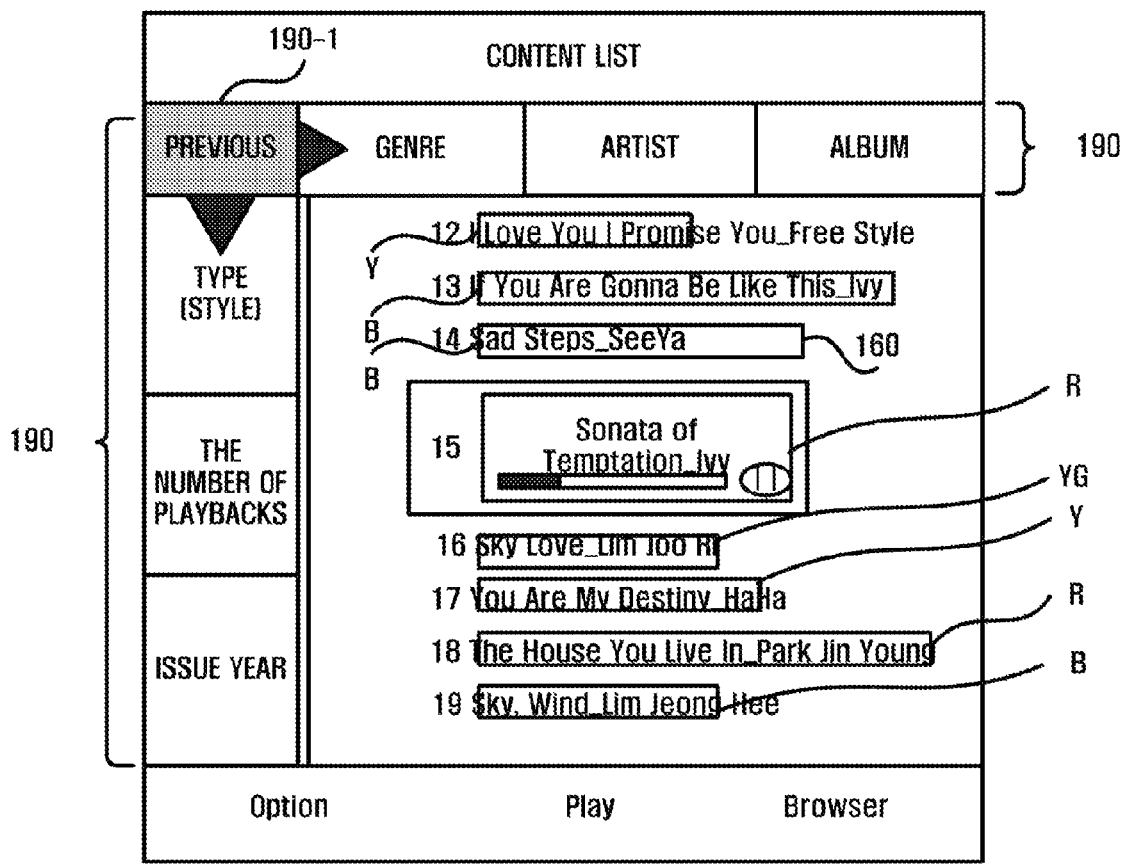
FIG. 3 is a view explaining another example of a user interface which includes a content list and is displayed on an output unit according to an exemplary embodiment of the present invention.

FIG. 3 is a view explaining another example of a user interface which includes a content list and is displayed on the output unit according to an exemplary embodiment of the present invention.

In an exemplary embodiment of the present embodiment, a plurality of information on the next category items 190 that can be browsed may be displayed on a screen. That is, by pressing the left and right direction buttons, the content list can be changed to any one of a content list belonging to the same genre as the content being currently played, a content list of the same artist as the content being currently played, and a content list in an album which the content being currently played belongs to. Also, by pressing the up and down direction buttons, the content list can be changed to any one of a content list having a type similar to the type of the content being currently played, a content list having a number of playbacks equal to the number of playbacks of the content being currently played, and a content list having the same issue year as the content being currently played. However, the change of the content list is not limited thereto, and the plurality of information on the next category items that can be browsed may be variously constructed. In addition, if a category that is displayed on the screen is selected through the input unit 110, the focus may be moved to the selected category. The focus may be positioned on the "Previous" item 190-1 in the content list before the category is changed.

As described above, a user can change the current content list to a content list that belongs to another category set on the basis of information on the content being currently played through a single manipulation using the buttons provided in the input unit 110. Accordingly, the user can change the current content list to any other content list without looking at the output unit 120 on which the content list is displayed.

FIG. 4 is a flowchart illustrating a method of displaying a content list according to an exemplary embodiment of the present invention.

If a user command is received in a state that a content list (A) is selected S100 and content in the selected content list (A) is played S110, a content list belonging to a category set on the basis of information on the content being currently played is displayed in accordance with the received command.

Here, the user command may be generated when a left or right direction button is pressed. In the case where the user interface including the content list as shown in FIG. 3 is displayed, different user commands may also be generated when an up or down direction button is pressed. In addition, when another button provided in the input unit 110 is pressed, a wheel is rotated, or two or more buttons are pressed in combination, the user command may be generated.

Figure 5A:
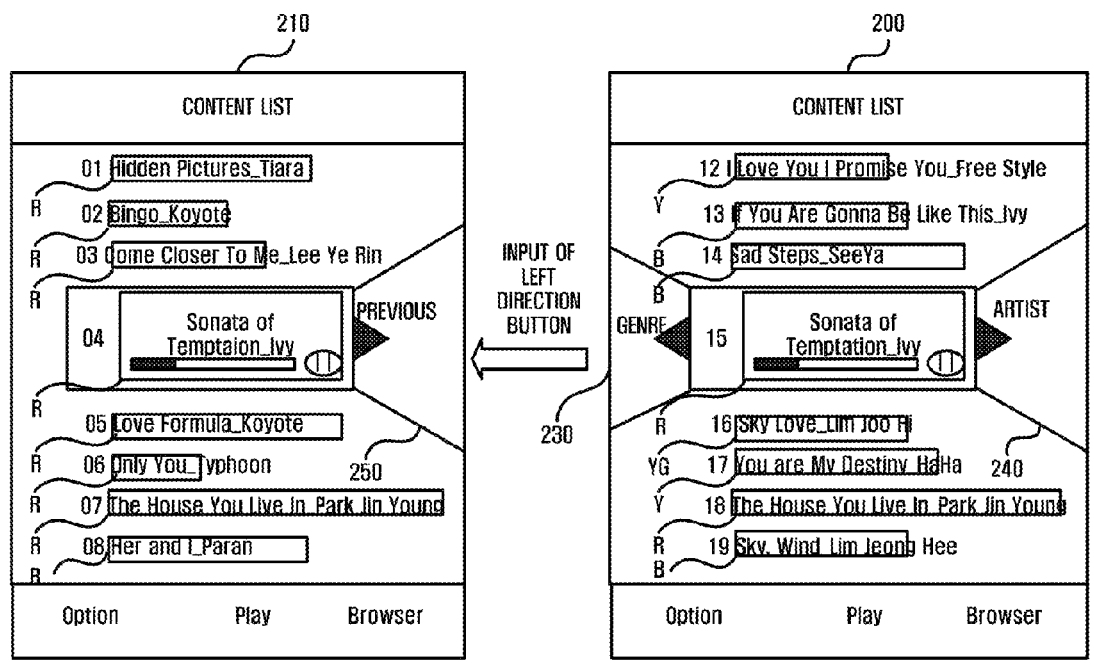
FIGS. 5A and 5B are views illustrating an example of a content list displayed through the method of FIG. 4.
Figure 5B:
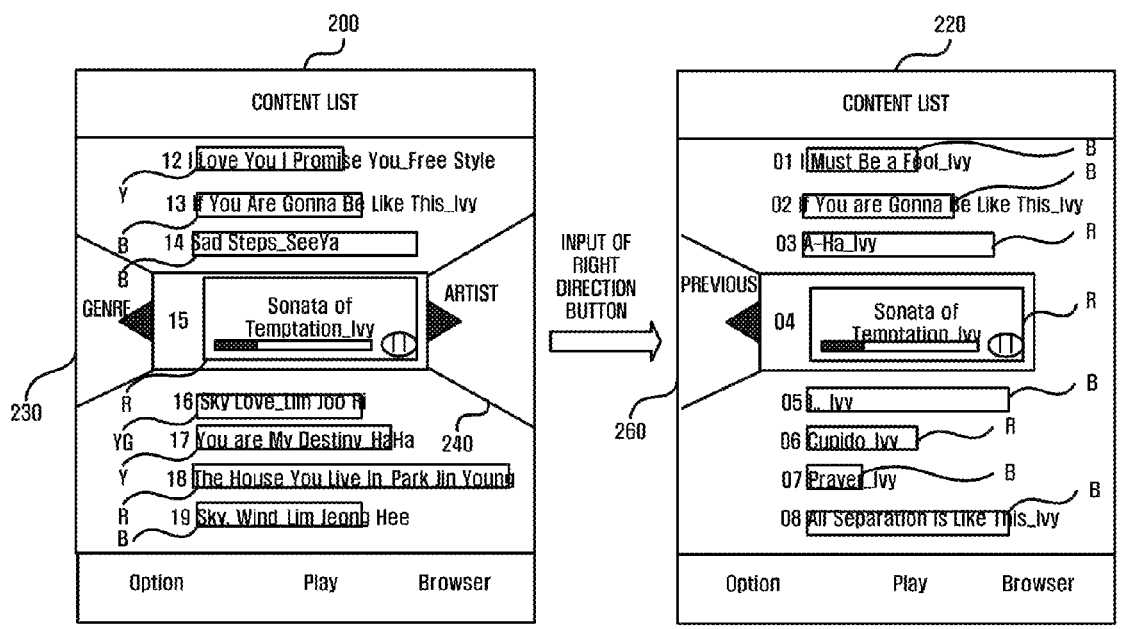

For example, it is assumed that in a state that the content list 200 is displayed on the output unit 120 as shown in FIG. 5A and FIG. 5B, an input of the left direction button is recognized as a command to change the current content list 200 to a content list 210 belonging to "the same genre as the content being currently played", and an input of the right direction button is recognized as a command to change the current content list 200 to a content list 220 corresponding to "the same artist as the content being currently played".

If the left direction button of the input unit 110 is pressed in a state that content (e.g., "Sonata of Temptation" by "IVY") in the content list 200 as shown in FIG. 5A is playing, the control unit 130 operates to recognize the left direction button signal, generate and display on the output unit 120 a content list (B) 210 belonging to the same genre (e.g., "Dance") as the content being currently played (e.g., "Sonata of Temptation" by "IVY") in operation S120, and then successively plays the content in the content list (B) 210 in operation S130. At this time, the "Genre" item 230 and the "Artist" item 240, having been positioned in the content list 200, may be changed to the "Previous" item 250. In this case, the input of the right direction button is recognized as a command to change the current content list to the previous content list 200, and the input of the left direction button is recognized as no command to change the content list. If the user intends to return to the content list 200 previously played S160, the user may input the right direction button to return to the content list 200 previously played S110.

In contrast, if the right direction button of the input unit 110 is pressed in a state as shown in FIG. 5B, the control unit 130 operates to recognize the right direction button signal, generate and display on the output unit 120 a content list (C) 220 of the same artist (e.g., "IVY") as the content being currently played (e.g., "Sonata of Temptation" by "IVY") in operation S140, and then successively plays the content in the content list (C) 220 in operation S150. At this time, the "Genre" item 230 and the "Artist" item 240, having been positioned in the content list 200, may be changed to the "Previous" item 260. In this case, the input of the left direction button is recognized as a command to change the current content list to the previous content list 200, and the input of the right direction button is recognized as no command to change the content list. If the user intends to return to the content list 200 previously played S160, the user may input the left direction button to return to the content list 200 previously played S110.

As described above, according to the exemplary embodiments of the present invention, various content lists based on information on the content being currently played can be displayed through a user's simple manipulation.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of displaying a content list, comprising:
   playing a content;
   receiving at least one of a first user command and a second user command; and
   displaying a content list comprising contents belonging to a first category which is set based on a first information on the currently-played content in response to the first user command being received, and displaying a content list comprising contents belonging to a second category which is set based on a second information on the currently-played content in response to the second user command being received,
   wherein the displayed content list includes a plurality of content bars expressed with lengths indicating playback history information of the contents, and
   wherein if the another content is first registered in the content list, the corresponding content bar is generated with a preset length, and if a skip or a stop of the another content is performed during playback of the another content, the preset length of the corresponding content bar is automatically shortened.

2. The method of claim 1, wherein the first and second information on the content being currently played includes at least one of metadata of the content being currently played, information similar to one of the first and second information on the content being currently played, playback history information of the content being currently played, and total resultant information collected from a plurality of users regarding the content being currently played.

3. The method of claim 2, wherein the first and second categories are set based on the metadata of the content being currently played, said metadata of the content being currently played including at least one of a genre of the content being currently played, a different genre from the genre of the content being currently played, a same artist as an artist of the content being currently played, a different artist from the artist of the content being currently played, an album that the content being currently played belongs to, a same issue year as an issue year of the content being currently played, and a different issue year from the issue year of the content being currently played.

4. The method of claim 2, wherein the first and second categories are set based on the information similar to the one of the first and second information on the content being currently played, said information similar to the one of the first and second information on the content being currently played including at least one of a type similar to a type of the content being currently played, and an artist having a style similar to a style of the artist of the content being currently played.

5. The method of claim 4, wherein the type similar to the type of the content being currently played is determined based on at least one of a tempo of the content being currently played, musical instruments used in the content being currently played, and a sales record of the content being currently played.

6. The method of claim 2, wherein the first and second categories are set based on the playback history information of the content being currently played, said playback history information of the content being currently played including at least one of a number of playbacks greater than a number of playbacks of the content being currently played, a number of playbacks fewer than the number of playbacks of the content being currently played, a number of playbacks equal to the number of playbacks of the content being currently played, a playback time longer than a playback time of the content being currently played, a playback time shorter than the playback time of the content being currently played, and a playback time equal to the playback time of the content being currently played.

7. The method of claim 2, wherein the first and second categories are set based on the total resultant information collected from the plurality of users regarding the content being currently played, said total resultant information including a range of a popularity ranking of an artist of the content being currently played.

8. The method of claim 1, wherein the first and second user commands are generated in accordance with inputs of up/down direction buttons or left/right direction buttons.

9. The method of claim 1, wherein the plurality of content bars are expressed with colors indicating genres of the contents.

10. The method of claim 1, wherein the playback history information includes at least one of a number of playbacks and a playback time, and as the number of playbacks of another content among the contents becomes larger or the playback time of the another content becomes longer, a corresponding content bar corresponding to the another content becomes longer.

11. An apparatus for displaying a content list, comprising:
    a processor which controls operations of,
    an input unit which receives at least one of a first user command and a second user command;
    an output unit which plays a content and displays a content list; and
    a control unit which controls the output unit to display the content list comprising contents belonging to a first category which is set based on a first information on the content being currently played in response to the first received user command, and to display the content list comprising contents belonging to a second category which is set based on a second information on the content being currently plated in response to the second received user command, wherein the content list displayed on the output unit includes a plurality of content bars expressed with lengths indicating playback history information of the contents, wherein if the another content is first registered in the content list, the corresponding content bar is generated with a preset length, and if a skip or a stop of the another content is performed during the playback of the another content the preset length of the corresponding content bar is automatically shortened.

12. The apparatus of claim 11, further comprising a communication unit which communicates with one or more content storage devices;

wherein the control unit communicates with the content storage devices through the communication unit, constructs the content list using the contents stored in the content storage devices, and controls the output unit to display the constructed content list.

13. The apparatus of claim 11, wherein the first and second information on the content being currently played includes at least one of metadata of the content being currently played, information similar to one of the first and second information on the content being currently played, playback history information of the content being currently played, and total resultant information collected from a plurality of users regarding the content being currently played.

14. The apparatus of claim 13, wherein the first and second categories are set based on the metadata of the content being currently played, said metadata including at least one of a genre of the content being currently played, a different genre from the genre of the content being currently played, a same artist as an artist of the content being currently played, a different artist from the artist of the content being currently played, an album that the content being currently played belongs to, a same issue year as an issue year of the content being currently played, and a different issue year from the issue year of the content being currently played.

15. The apparatus of claim 13, wherein the first and second categories are set based on the information similar to the one of the first and second information on the content being currently played, said information similar to the one of the first and second information on the content being currently played including at least one of a type similar to a type of the content being currently played, and an artist having a style similar to a style of the artist of the content being currently played.

16. The apparatus of claim 15, wherein the type similar to the type of the content being currently played is determined based on at least one of a tempo of the content being currently played, musical instruments used in the content being currently played, and a sales record of the content being currently played.

17. The apparatus of claim 13, wherein the first and second categories are set based on the playback history information of the content being currently played, said playback history information including at least one of a number of playbacks greater than a number of playbacks of the content being currently played, a number of playbacks fewer than the number of playbacks of the content being currently played, a number of playbacks equal to the number of playbacks of the content being currently played, a playback time longer than a playback time of the content being currently played, a playback time shorter than the playback time of the content being currently played, and a playback time equal to the playback time of the content being currently played.

18. The apparatus of claim 13, wherein the first and second categories are set based on the total resultant information collected from the plurality of users regarding the content being currently played, said total resultant information including a range of a popularity ranking of an artist of the content being currently played.

19. The apparatus of claim 11, wherein the input unit includes up/down direction buttons or left/right direction buttons, and the first and second user commands are generated in accordance with inputs of the received through the input unit.

20. The apparatus of claim 11, wherein the plurality of content bars are expressed with colors indicating genres of the contents.

21. The apparatus of claim 11, wherein the playback history information includes at least one of a number of playbacks and a playback time, and as the number of playbacks of another content among the contents becomes greater or the playback time of the another content becomes longer, a corresponding content bar corresponding to the another content becomes longer.

22. A method of displaying a plurality of contents, comprising:

displaying a first content list comprising a first group of contents from among the plurality of contents;

playing one of the first group of contents;

receiving a user command; and changing the displayed first content list to a second content list comprising a second group of contents from among the plurality of contents, the second group of contents belonging to a category which is set based on the received user command and to which the one of the first group of contents belongs, wherein the first group of contents comprises a plurality of content bars expressed with lengths based on respective playback history information of the first contents, wherein if the another content is first registered in the first group of contents, the corresponding content bar is generated with a reset length, and if a ski or a stop of the another content is performed during playback of the another content, the preset length of the corresponding content bar is automatically shortened.

23. The method according to claim 22, wherein the first group of contents comprises a plurality of content bars, and colors of the content bars are based on the respective categories of the content bars.

* * * * *